US011703180B1

(12) United States Patent
Chen

(10) Patent No.: US 11,703,180 B1
(45) Date of Patent: Jul. 18, 2023

(54) BRACKET FIXABLE TO DESK EDGE

(71) Applicant: Chusong Chen, Guangdong (CN)

(72) Inventor: Chusong Chen, Guangdong (CN)

( * ) Notice: Subject to any disclaimer, the term of this patent is extended or adjusted under 35 U.S.C. 154(b) by 0 days.

(21) Appl. No.: 17/954,243

(22) Filed: Sep. 27, 2022

(51) Int. Cl.
| | |
|---|---|
| *F16M 11/10* | (2006.01) |
| *F16M 13/02* | (2006.01) |
| *F16M 11/16* | (2006.01) |
| *F16M 11/04* | (2006.01) |

(52) U.S. Cl.
CPC .......... *F16M 13/02* (2013.01); *F16M 11/046* (2013.01); *F16M 11/10* (2013.01); *F16M 11/16* (2013.01)

(58) Field of Classification Search
USPC ........ 248/291.1, 292.11, 292.14, 299.1, 121, 248/122.1, 123.11, 123.2, 162.1, 405
See application file for complete search history.

(56) References Cited

U.S. PATENT DOCUMENTS

| | | | | |
|---|---|---|---|---|
| 2009/0095874 | A1* | 4/2009 | Young | F16M 11/2021 248/583 |
| 2010/0224750 | A1* | 9/2010 | Webber | F16M 11/10 248/288.11 |
| 2017/0293206 | A1* | 10/2017 | Wood | F16M 11/2021 |

OTHER PUBLICATIONS

Senyu Technology Development (Guangzhou) Co., Ltd. and Joystick Mount https://www.amazon.com/dp/B09Y5KYQHC https://www.amazon.com/dp/B09Y5K7BRQ https://www.amazon.com/dp/B09Y5MLCKP https://www.amazon.com/dp/BO9Y5LZJZB.
Guangzhou Diwang Electronic Commerce Co., Ltd. and Joystick Mount https://www.amazon.com/dp/B09JWLP7B9.
Foshan Tusuojun Information Technology Co., Ltd. and Joystick Mount https://www.walmart.com/ip/seort/1734937756 https://www.walmart.com/ip/seort/1410852455 https://www.walmart.com/ip/seort/1601672834 https://www.walmart.com/ip/seort/1621345087.
Senyu Technology Development (Guangzhou) Co., Ltd. and Joystick Mount https://www.amazon.ca/dp/B09Y924BHB https://www.amazon.ca/dp/B09Y8ZD5RB.

(Continued)

*Primary Examiner* — Alfred J Wujciak

(57) ABSTRACT

The present invention provides a bracket fixable to a desk edge, the bracket including: a fixing portion, a holding portion and a connecting assembly, wherein the connecting assembly has one end connected to the fixing portion and the other end connected to the holding portion; the connecting assembly includes a connecting body, having a first end and a second end, a first connecting member arranged at the first end, and a second connecting member arranged at the second end; the first connecting member has a first body portion perpendicular to the connecting body, and a first locking portion fixed to the fixing portion; the first body portion is provided with a first arc-shaped slot; the second connecting member has a second body portion perpendicular to the connecting body, and a second locking portion fixed to the holding portion; the second body part is provided with a second arc-shaped slot; and the connecting assembly further includes a first screw slidable in the first arc-shaped slot, and a second screw slidable in the second arc-shaped slot.

9 Claims, 2 Drawing Sheets

(56) References Cited

OTHER PUBLICATIONS

Jahaw Ltd and Joystick Mount https://www.amazon.co.uk/dp/B09VP96GR1 https://www.amazon.co.uk/dp/B09VP9937M https://www.amazon.co.uk/dp/B09JVWFQ6Y.

Guangzhou Meijinda Technology Co., Ltd. and Joystick Mount https://www.amazon.de/dp/B09VXD48BP https://www.amazon.de/dp/B09VXCGFB4 https://www.amazon.de/dp/B0B398Z19Q https://www.amazon.de/dp/B0B399XLN2.

Foshan Hantaohong Network Technology Co., Ltd. and Joystick Mount https://www.amazon.fr/dp/B09ZP5BDSW.

Guangzhou Meijinda Technology Co., Ltd. and Joystick Mount https://www.amazon.it/dp/B0B19X248R.

Guangzhou Diwang Electronic Commerce Co., Ltd. and Joystick Mount https://www.amazon.co.jp/dp/B0B4JJPSJM https://www.amazon.co.jp/dp/B09ZHWMX79 https://www.amazon.co.jp/dp/B0B48NS8B2 https://www.amazon co.jp/dp/B09VGMY45G.

Guangzhou Diwang Electronic Commerce Co., Ltd. Appl. No. 2021-128239, Oct. 14, 2021 U.S. Appl. No. 97/087,051, filed Oct. 21, 2021.

Foshan Hantaohong Network Technology Co., Ltd. No. 018225033, Apr. 10, 2020.

Guangzhou Meijinda Technology Co., Ltd. and Jahaw Ltd No. 018579011, Oct. 15, 2021.

Senyu Technology Development (Guangzhou) Co., Ltd. No. 2175001, Mar. 24, 2022 U.S. Appl. No. 97/329,730, filed Mar. 24, 2022.

\* cited by examiner

BRACKET FIXABLE TO DESK EDGE

TECHNICAL FIELD

The present invention relates to the technical field of supports and in particular to a bracket fixable to a desk edge.

BACKGROUND

Modern people's work and life are often inseparable from electronic products. Whether they work at their desks or entertain and relax, they usually sit at their desks. In order to avoid too many items on a desk top and appearing cluttered, various supports adapted to desks have emerged, among which supports adapted to desk edges are favored by consumers because they effectively use the space under the desk top and are easy to use.

However, the common supports adapted to the desk edges are unfoldable and are inconvenient to store, and the assembly and disassembly operations are complicated, affecting the user experience.

SUMMARY

Based on this, it is necessary to propose a bracket fixable to a desk edge, which bracket is convenient to store and operate.

The present invention provides a bracket fixable to a desk edge, the bracket including: a fixing portion configured to be fixed to a desk top; a holding portion configured to be arranged under the desk top to hold articles; and a connecting assembly having one end connected to the fixing portion and the other end connected to the holding portion, wherein the connecting assembly includes a connecting body, having a first end and a second end, a first connecting member arranged at the first end, and a second connecting member arranged at the second end; the first connecting member has a first body portion perpendicular to the connecting body, and a first locking portion fixed to the fixing portion; the first body portion is provided with a first arc-shaped slot; the second connecting member has a second body portion perpendicular to the connecting, body, and a second locking portion fixed to the holding portion; the second body part is provided with a second arc-shaped slot; and the connecting assembly further includes a first screw fixed to the first end and slidable in the first arc-shaped slot, and a second screw fixed to the second end and slidable in the second arc-shaped slot.

Optionally, the first arc-shaped slot includes a first slot end remote from the first locking portion and a second slot end proximate to the first locking portion; the second arc-shaped slot includes a third slot end remote from the second locking portion and a fourth slot end proximate to the second, locking portion; when the first screw slides to the first slot, end and the second screw slides to the third slot end, the fixing portion, the connecting body and the holding portion are parallel to one another; and when the first screw slides to the second slot end and the second screw slides to the fourth slot end, the fixing portion is parallel to the holding portion, and the connecting body is perpendicular to the fixing portion and the holding portion.

Optionally, the fixing portion is in the shape of a flat plate; and the connecting assembly further includes a clamping assembly movably connected to the connecting body, the clamping assembly including a base connected to the connecting body, a clamping member projecting from the base to the fixing portion, and a locking rod connected to the clamping member.

Optionally, one end, proximate to the fixing portion, of the base is provided with a tube; the clamping member is in the shape of a thumb pin, which includes a flat head and a tail penetrating the tube; and the locking rod is connected to the tail and is rotatable about one end, remote from the fixing portion, of the base.

Optionally, the sum of the lengths of the fixing portion and the clamping assembly is less than or equal to the length of the connecting body.

Optionally, the connecting body is provided with a first slide slot extending from the first end to the second end; and the base is slidable along the first slide slot.

Optionally, the holding portion includes a first strip-shaped part and a second strip-shaped part arranged in parallel to each other; and the second locking portion is fixed to opposite side faces of the first strip-shaped part and the second strip-shaped part.

Optionally, the side faces of the first strip-shaped part and the second strip-shaped part are provided with second slide slots; and the holding portion further includes a slider perpendicularly arranged on the first strip-shaped part and the second strip-shaped part and slidable, along the second slide slots.

Optionally, the slider includes a support portion arranged on upper surfaces of the first strip-shaped part and the second strip-shaped part and slide portions connected to the support portion and engaged with the second slide slots; and the support portion is provided with a plurality of through-holes.

Optionally, the first strip-shaped part has a length equal to that of the second strip-shaped part; and the connecting body has a length less than or equal to that of the first strip-shaped part.

The bracket fixable to a desk edge provided by the present invention includes: a fixing portion configured to be fixed to a desk top; a holding portion configured to be arranged under the desk top to hold articles; and a connecting assembly having one end connected to the fixing portion and the other end connected to the holding portion, wherein the connecting assembly includes a connecting body having a first end and a second end, a first connecting member arranged at the first end, and a second connecting member arranged at the second end; the first connecting member has a first body portion perpendicular to the connecting body, and a first locking portion fixed to the fixing portion; the first body portion is provided with a first arc-shaped slot; the second connecting member has a second body portion perpendicular to the connecting body, and a second locking portion fixed to the holding portion; the second body part is provided with a second arc-shaped slot; and the connecting assembly further includes a first screw fixed to the first end and slidable in the first arc-shaped slot, and a second screw fixed to the second end and slidable in the second arc-shaped slot. The first connecting member and the second connecting member are matched with slidable screws, so that the bracket fixable to a desk edge provided by the present invention can realize the folding function and achieve the effect of convenient storage. Moreover, since the fixing portion, the holding portion and the connecting component do not need to be assembled and disassembled separately, the operation is convenient and the user experience is improved.

BRIEF DESCRIPTION OF DRAWINGS

In order to illustrate more clearly technical schemes in specific embodiments of the present invention or the related art, the accompanying drawings used in description of the specific embodiments or the related art will be briefly described below, and obviously, the accompanying drawings in the following description are only some embodiments of the present invention, and for those of ordinary skill in the art, other drawings can be derived on the basis of these drawings without any inventive effort.

DETAILED DESCRIPTION

The technical schemes of the present invention are clearly and comprehensively described hereinafter with reference to the accompanying drawings. It is obvious that the described embodiments are only some of the embodiments of the present invention instead of all the embodiments thereof. All other embodiments obtained by those of ordinary skill in the art based on the embodiments of the present invention without inventive effort are within the scope of the present invention.

In the description of the present invention, it should be noted that, descriptions relating to orientation, for example, orientation or positional relationships indicated by "center", "up". "down", "left", "right", "vertical", "horizontal", "inside", "outside", etc. are based on the orientation or positional relationships shown in the accompanying drawings, and are to facilitate the description of the present invention and simplify the description only, rather than indicating or implying that the device or element referred to must have a specific orientation or be constructed and operated in a specific orientation, and therefore cannot be construed as limiting the present invention. In addition, the terms "first", "second" and "third" are for the purpose of description only and should not be construed as indicating or implying relative importance.

Figure 1:
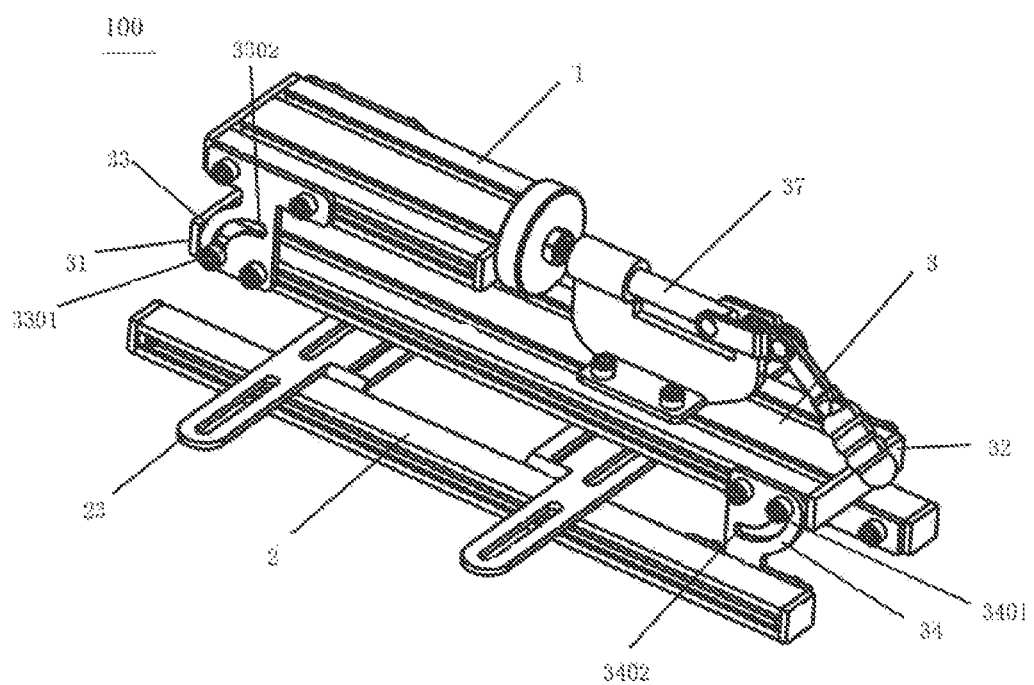
FIG. 1 is a schematic assembly view of a bracket fixable to a desk edge in a folded state according to an embodiment.
Figure 2:
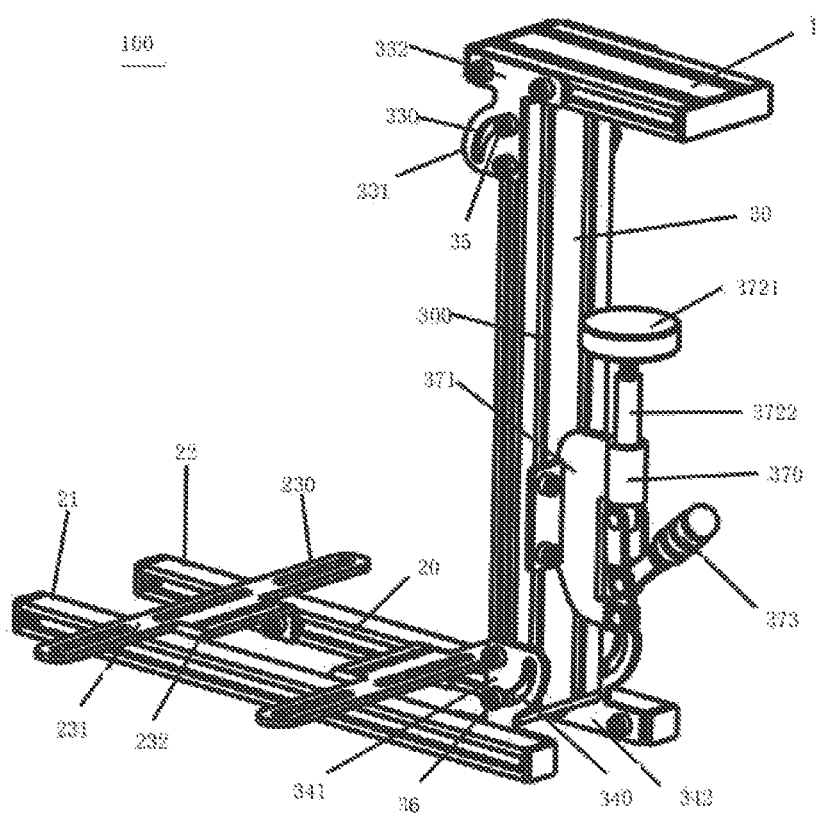
FIG. 2 is a schematic assembly view of a bracket fixable to a desk edge in an unfolded state according to an embodiment.

As shown in FIGS. 1 and 2, the present invention provides a bracket 100 fixed to a desk edge, the bracket including: a fixing portion 1, a holding portion 2 and a connecting assembly 3. The fixing portion 1 is configured to be fixed to a desk top: the holding portion 2 is configured to be arranged under the desk top to hold articles; the connecting assembly 3 has one end connected to the fixing portion 1 and the other end connected to the holding portion 2.

The connecting assembly 3 includes a connecting body 30 having a first end 31 and a second end 32, a first connecting member 33 arranged at the first end 31, and a second connecting member 34 arranged at the second end 32. The first connecting member 33 has a first body portion 331 perpendicular to the connecting body 30, and a first locking portion 332 fixed to the fixing portion 1. The first body portion 331 is provided with a first arc-shaped slot 330. The second connecting member 34 has a second body portion 341 perpendicular to the connecting body 30, and a second locking portion 342 fixed to the holding portion 2. The second body portion 341 is provided with a second arc-shaped slot 340.

The connecting assembly 3 further includes a first screw 35 fixed to the first end 31 and slidable in the first arc-shaped slot 330, and a second screw 36 fixed to the second end 32 and slidable in the second arc-shaped slot 340. The first arc-shaped slot 330 includes a first slot end 3301 remote from the first, locking portion 332 and a second slot end 3302 proximate to the first locking portion 332. The second arc-shaped slot 340 includes a third slot end 3401 remote from the second locking portion 342 and, a fourth slot end 3402 proximate to the second locking portion 342. As shown in FIG. 1, when the first screw 35 slides to the first slot end 3301 and the second screw 36 slides to the third slot end 3401, the fixing portion 1, the connecting body 3 and the holding portion 2 are parallel to one another. As shown in FIG. 2, when the first screw 35 slides to the second slot end 3302 and the second screw 36 slides to the fourth slot end 3402, the fixing portion 1 is parallel to the holding portion 2, and the connecting body 3 is perpendicular to the fixing portion 1 and the holding portion 2. When the bracket 100 needs to be folded or unfolded, the first screw 35 and the second screw 36 are untightened to slide in the first arc-shaped slot 330 and the second arc-shaped slot 340, respectively, so that the relative positions of the fixing portion 1, the holding portion 2 and the connecting assembly 3 can be smoothly changed. If the first screw 35 and the second screw 36 are tightened, the connection state of the fixing portion 1, the holding portion 2 and the connecting assembly 3 can be fixed.

In this embodiment, the fixing portion 1 is in the shape of a flat plate; and the first locking portion 332 is fixed to opposite sides of the fixing portion 1. The connecting assembly 3 further includes a clamping assembly 37 movably connected to the connection body 30. The clamping assembly 37 includes a base 371 connected to the connecting body 30, a clamping member 372 projecting from the base 371 to the fixing portion 1, and a locking rod 373 connected to the clamping member 372. Specifically, one end, proximate to the fixing portion 1, of the base 371 is provided with a tube 370; the clamping member 372 is in the shape of a thumb pin, which includes a flat head 3721 and a tail 3722 penetrating the tube 370; and the locking rod 373 is connected to the tail 3722 and can rotate about one end, remote from the fixing portion 1, of the base 371. The connecting body 30 is provided with first slide slots 300 extending from the first end 31 to the second end 32; and the base 371 can slide along the first slide slots 300. When it is necessary to fix the fixing portion 1 to the desk top, the fixing portion 1 in the shape of a flat plate is pressed against the desk top, the connecting assembly 3 hangs down along the desk edge, and the base 371 is slid from below the desk top to bring the clamping member 372 close to the fixing portion. When the clamping, member 372 is abutted against a lower surface of the desk, the locking rod 373 is turned to fix the clamping member 372 in position and screws of the base 371 are tightened to fix the clamping assembly 37 as a whole, so that the bracket 100 can be clamped and fixed to the desk top.

In other embodiments, there are also other ways of fixing the fixing portion to the desk top. For example, the fixing portion may be a U-shaped clamp with an opening facing the desk, and the size of the U-shaped opening is adjusted by means of a bolt to adapt to the desk top with a different thickness and clamp the desk top.

Optionally, the sum of the lengths of the fixing portion 1 and the clamping assembly 37 is less than or equal to the length of the connecting body 30. In this way, the bracket 100 does not waste the storage space in the folded state.

The holding portion 2 includes a first strip-shaped part 21 and a second strip-shaped part 22 arranged in parallel to each other. The first strip-shaped part 21 has a length equal to that of the second strip-shaped part 22. The connecting body 30 has a length less than or equal to that of the first strip-shaped part 21. The second locking portion 342 is fixed to opposite sides of the first strip-shaped part 21 and the second strip-shaped part 22. The side faces of the first strip-shaped part 21 and the second strip-shaped part 22 are provided with second slide slots 20. The holding portion further includes a slider 2 which is perpendicularly arranged on the first strip-shaped part and the second strip-shaped part and which can slide along the second slide slots 23.

In this embodiment, the holding portion 2 includes two sliders 23. Each slider 23 includes a support portion 231 arranged on upper surfaces of the first strip-shaped part 21 and the second strip-shaped part 22, and slide portions 232 connected to the support portion 231 and engaged with the second slide slots 20. The support portion 231 is provided with a plurality of through-holes 230. In this way, the holding portion 2 can have the spacing between the two sliders 23 adjusted according to the size and the shape of the held articles.

The bracket fixable to a desk edge provided by the present invention includes: a fixing portion configured to be fixed to a desk top; a holding portion configured to be arranged under the desk top to hold articles; and a connecting assembly having one end connected to the fixing portion and the other end connected to the holding portion, wherein the connecting assembly includes a connecting body having a first end and a second end, a first connecting member arranged at the first end, and a second connecting member arranged at the second end; the first connecting member has a first body portion perpendicular to the connecting body, and a first locking portion fixed to the fixing portion; the first body portion is provided with a first arc-shaped slot; the second connecting member has a second body portion perpendicular to the connecting body, and a second locking portion fixed to the holding portion; the second body part is provided with a second arc-shaped slot; and the connecting assembly further includes a first screw fixed to the first end and slidable in the first arc-shaped slot, and a second screw fixed to the second end and slidable in the second arc-shaped slot. The first connecting member and the second connecting member are matched with slidable screws, so that the bracket fixable to a desk edge provided by the present invention can realize the folding function and achieve the effect of convenient storage. Moreover, since the fixing portion, the holding portion and the connecting component do not need to be assembled and disassembled separately, the operation is convenient and the user experience is improved.

The above embodiments are only used to illustrate the technical scheme of the present invention and are not intended to limit the present invention. Although the present invention has been described in detail with reference to the foregoing embodiments, those of ordinary skill in the art will understand that modifications can be made to the technical schemes described in the aforementioned embodiments, or equivalent replacements can be made to some of or all the technical features in the embodiments; and these modifications or replacements do not make the essence of the corresponding technical schemes deviate from the scope of the technical schemes of the embodiments of the present invention.

What is claimed is:
1. A bracket fixable to a desk edge, the bracket comprising:
   a fixing portion configured to be fixed to a desk top;
   a holding portion configured to be arranged under the desk top to hold articles; and
   a connecting assembly having one end connected to the fixing portion and an other end connected to the holding portion, wherein
   the connecting assembly comprises a connecting body having a first end and a second end, a first connecting member arranged at the first end, and a second connecting member arranged at the second end; the first connecting member has a first body portion perpendicular to the connecting body, and a first locking portion fixed to the fixing portion; the first body portion is provided with a first arc-shaped slot; the second connecting member has a second body portion perpendicular to the connecting body, and a second locking portion fixed to the holding portion; the second body part is provided with a second arc-shaped slot; and the connecting assembly further comprises a first screw fixed to the first end and slidable in the first arc-shaped slot, and a second screw fixed to the second end and slidable in the second arc-shaped slot; wherein
   the connecting assembly further comprises a clamping assembly movably connected to the connecting body, the clamping assembly comprising a base connected to the connecting body, a clamping member projecting from the base to the fixing portion, and a locking rod connected to the clamping member;
   one end, proximate to the fixing portion, of the base is provided with a tube; the clamping member is in a shape of a thumb pin, which comprises a flat head and a tail penetrating the tube; and the locking rod is connected to the tail and is rotatable about one end, remote from the fixing portion, of the base.

2. The bracket fixable to a desk edge of claim 1, wherein the first arc-shaped slot comprises a first slot end remote from the first locking portion and a second slot end proximate to the first locking portion; the second arc-shaped slot comprises a third slot end remote from the second locking portion and a fourth slot end proximate to the second locking portion; when the first screw slides to the first slot end and the second screw slides to the third slot end, the fixing portion, the connecting body and the holding portion are parallel to one another; and when the first screw slides to the second slot end and the second screw slides to the fourth slot end, the fixing portion is parallel to the holding portion, and the connecting body is perpendicular to the fixing portion and the holding portion.

3. The bracket fixable to a desk edge of claim 1, wherein the fixing portion is in a shape of a flat plate.

4. The bracket fixable to a desk edge of claim 1, wherein a sum of lengths of the fixing portion and the clamping assembly is less than or equal to a length of the connecting body.

5. The bracket fixable to a desk edge of claim 4, wherein the connecting body is provided with a first slide slot extending from the first end to the second end; and the base is slidable along the first slide slot.

6. The bracket fixable to a desk edge of claim 1, wherein the holding portion comprises a first strip-shaped part and a second strip-shaped part arranged in parallel to each other; and the second locking portion is fixed to opposite side faces of the first strip-shaped part and the second strip-shaped part.

7. The bracket fixable to a desk edge of claim 6, wherein the side faces of the first strip-shaped part and the second strip-shaped part are provided with second slide slots; and the holding portion further comprises a slider perpendicularly arranged on the first strip-shaped part and the second strip-shaped part and slidable along the second slide slots.

8. The bracket fixable to a desk edge of claim 7, wherein the slider comprises a support portion arranged on upper surfaces of the first strip-shaped part and the second strip-shaped part, and slide portions connected to the support portion and engaged with the second slide slots; and the support portion is provided with a plurality of through-holes.

9. The bracket fixable to a desk edge of claim 6, wherein the first strip-shaped part has a length equal to a length of the second strip-shaped part; and the connecting body has a length less than or equal to the length of the first strip-shaped part.

\* \* \* \* \*